US011636110B1

(12) United States Patent
Chan et al.

(10) Patent No.: US 11,636,110 B1
(45) Date of Patent: Apr. 25, 2023

(54) METADATA SEARCH VIA N-GRAM INDEX

(71) Applicant: Snowflake Inc., Bozeman, MT (US)

(72) Inventors: Lin Chan, Bellevue, WA (US); Tianyi Chen, Kirkland, WA (US); Benoit Dageville, San Mateo, CA (US); Yiming Kang, Seattle, WA (US); Jun Luo, Bellevue, WA (US); Nithin Mahesh, Redmond, WA (US); Eric Robinson, Sammamish, WA (US); Brian Smith, Hillsborough, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 17/457,010

(22) Filed: Nov. 30, 2021

Related U.S. Application Data

(60) Provisional application No. 63/273,348, filed on Oct. 29, 2021.

(51) Int. Cl.
*G06F 16/00* (2019.01)
*G06F 16/2453* (2019.01)
*G06F 16/22* (2019.01)
*G06F 16/23* (2019.01)
*G06F 21/62* (2013.01)

(52) U.S. Cl.
CPC .... *G06F 16/24549* (2019.01); *G06F 16/2228* (2019.01); *G06F 16/2379* (2019.01); *G06F 21/6227* (2013.01)

(58) Field of Classification Search
CPC ........ G06F 16/38; G06F 16/438; G06F 16/48; G06F 16/9535; G06F 16/9536; G06F 2216/03; G06F 40/205; G06F 40/295; G06F 16/24549; G06F 16/2228; G06F 16/2379; G06F 21/6227; G06Q 30/0256; G06Q 50/01
See application file for complete search history.

(56) References Cited

U.S. PATENT DOCUMENTS

| 2013/0067062 | A1* | 3/2013 | Gaitonde | H04L 61/2015 709/224 |
| 2018/0075050 | A1* | 3/2018 | Jiang | G06F 16/134 |
| 2019/0102441 | A1* | 4/2019 | Malak | G06F 16/285 |
| 2019/0205474 | A1* | 7/2019 | Pawar | G06Q 50/01 |
| 2020/0394223 | A1* | 12/2020 | Nishimura | G06F 40/242 |

* cited by examiner

*Primary Examiner* — Dinku W Gebresenbet
(74) *Attorney, Agent, or Firm* — Schwegman Lundberg & Woessner, P.A.

(57) ABSTRACT

As described herein, a N-Gram index may be created and the search may be conducted using the index, which will lead to faster search results. The N-Gram index may also include partial N-Gram components to capture more relevant data. Moreover, as described herein, the search may also take into account recent log data that has not yet been indexed. Techniques for building an index store using log data and efficiently searching the index store and log data to process search requests are described herein.

24 Claims, 10 Drawing Sheets

… (1)

METADATA SEARCH VIA N-GRAM INDEX

CROSS-REFERENCE TO RELATED APPLICATION

This application claims the benefit of priority to U.S. Provisional Patent Application Ser. No. 63/273,348 filed Oct. 29, 2021, the contents of which are incorporated herein by reference in its entirety.

TECHNICAL FIELD

The present disclosure generally relates to databases and, more specifically, to using prefix indexing to optimize processing of searches in a database system.

BACKGROUND

To find and extract information from a database, a search, using a query statement, is typically used. A database system processes the search and returns certain data according to whether a search string matches data in the database. However, it can be challenging to execute searches on a very large table because a significant amount of time and computing resources are required to scan an entire table to identify data that satisfies the search. For example, some existing search strategies can traverse an entity tree and check every entity in the tree to see if it matches the search string. This can become extremely slow and expensive where there are a lot of entities.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As noted above, processing searches directed to very large tables is challenging because a significant amount of time and computing resources are required to scan an entire table to identify data that satisfies the search. Therefore, it can be desirable to execute a search without scanning the entire table. As described herein, a N-Gram index may be created and the search may be conducted using the index, which will lead to faster search results. The N-Gram index may also include partial N-Gram components to capture more relevant data. Moreover, as described herein, the search may also take into account recent log data that has not yet been indexed. Techniques for building an index store using log data and efficiently searching the index store and log data to process search requests are described herein.

Figure 1:
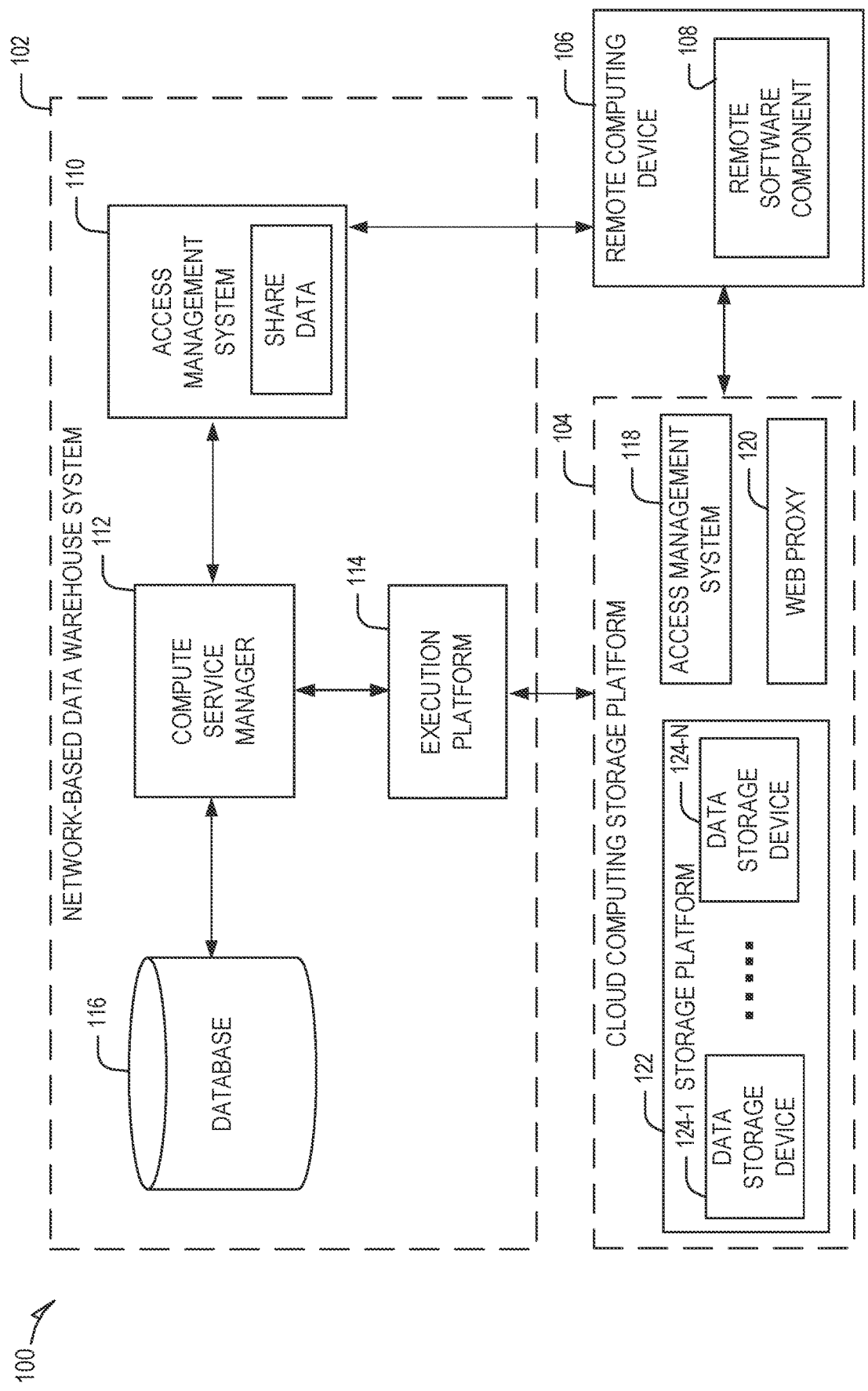
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generate result data based on processing, analyzing, or otherwise transforming the input data. As an example, the remote software component 108 can be a data provider or data consumer that enables database tracking procedures.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
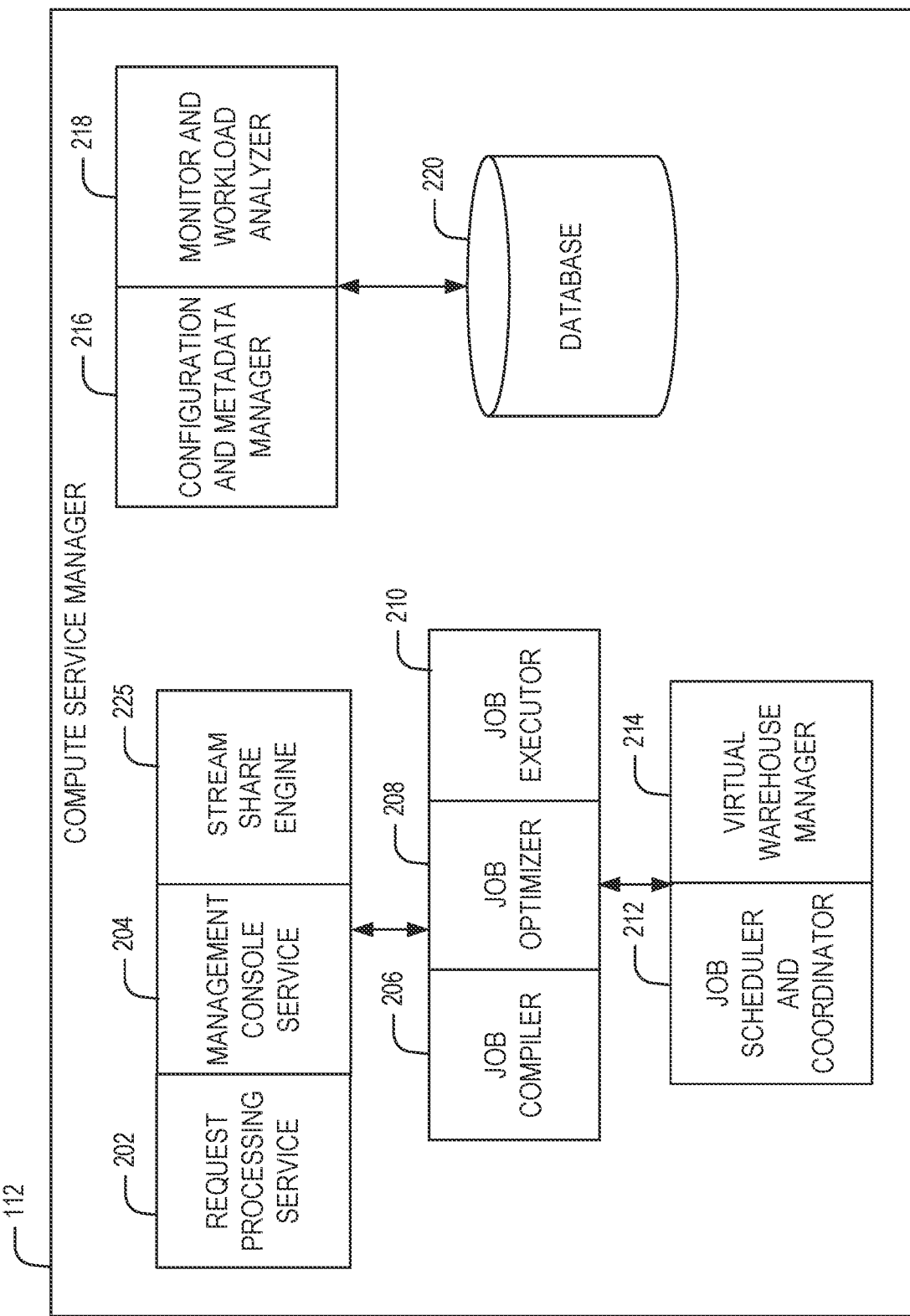
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
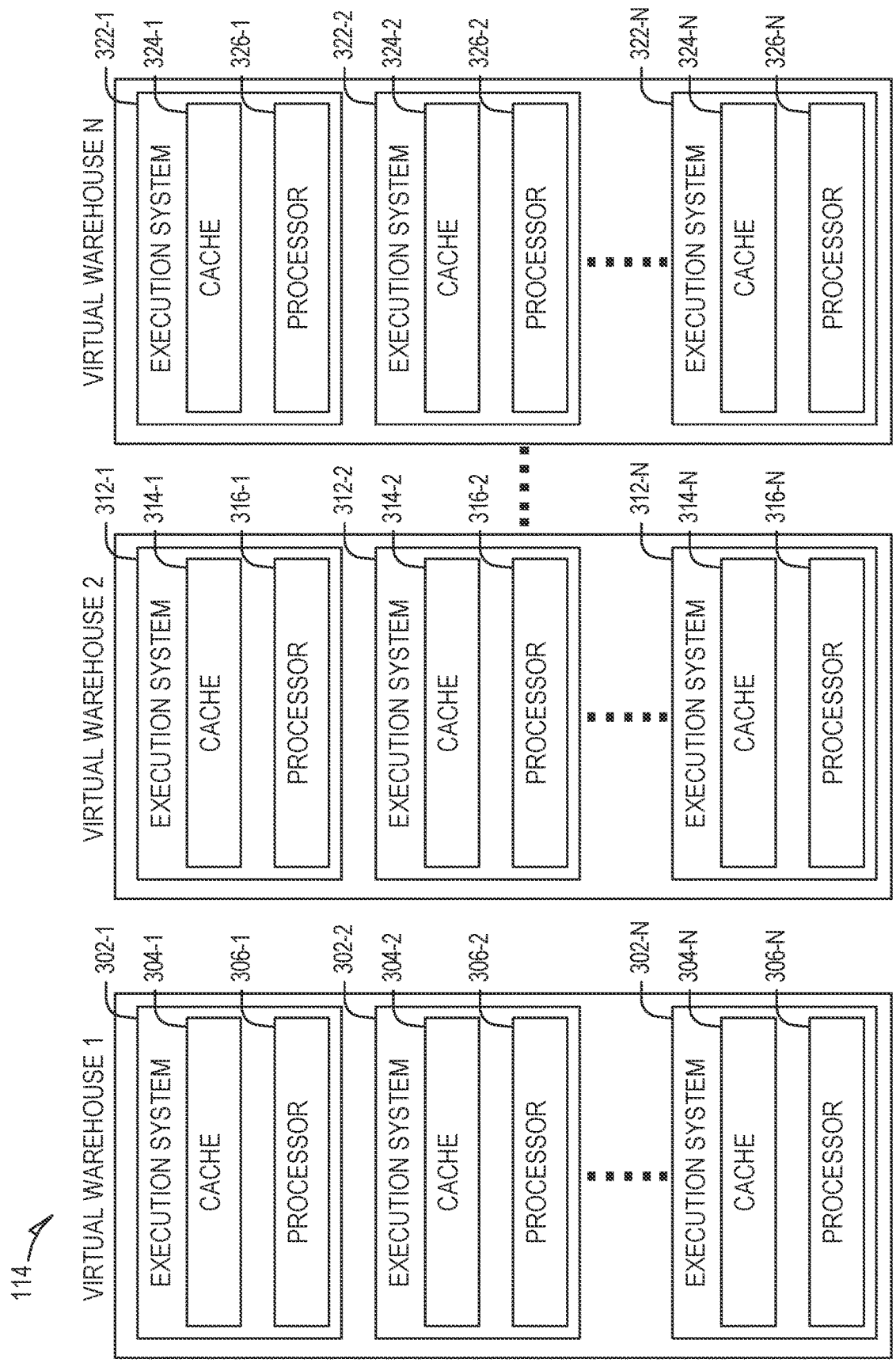
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and N are associated with the same execution platform 114, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Next, techniques for N-Gram indexing will be described. An N-gram index may be generated for the metadata associated with various entities, such as database name, schema name, table name, table column, warehouse, etc. Thus, a search can directly find the matched entities from the N-Gram index and return the entities that the user has permission to access. This may increase the speed of searching as compared to search strategies that traverse the entity tree to find the matched entities.

For a given value, the database system may generate a set of N-grams by breaking the value into multiple segments of N-length. Let's consider a table named "foobar" as an example where N=4. Here, the N-Gram index may build indexes for "foob", "ooba", and "obar", each having 4 characters. Thus, if the user searches "foo", the system may directly find index "foob".

The N-Gram index may also support partial N-grams. Consider in the example above for "foobar", the user searches "bar", which would not be matched with any of the N-Gram indexes described above. But the partial N-Gram may further index the last N characters, so that in addition to "obar", it would also index "bar", "ar" and "r". Thus, a search of "bar" would be matched using partial N-gram indexing. Hence, the partial N-Gram indexing supports searching of arbitrary strings. The N-Gram index may be stored in a metadata store. Moreover, as described herein, a multi-version index store may be created, updated, and stored for use in searching.

The N-gram strings may also be used for autocompletion. That is, if a user starts typing a search string, the N-gram strings may be used to suggest autocomplete options to the user. Moreover, the N-gram strings may be used to correct typos and to return suggestions for correcting the typos.

Figure 4:
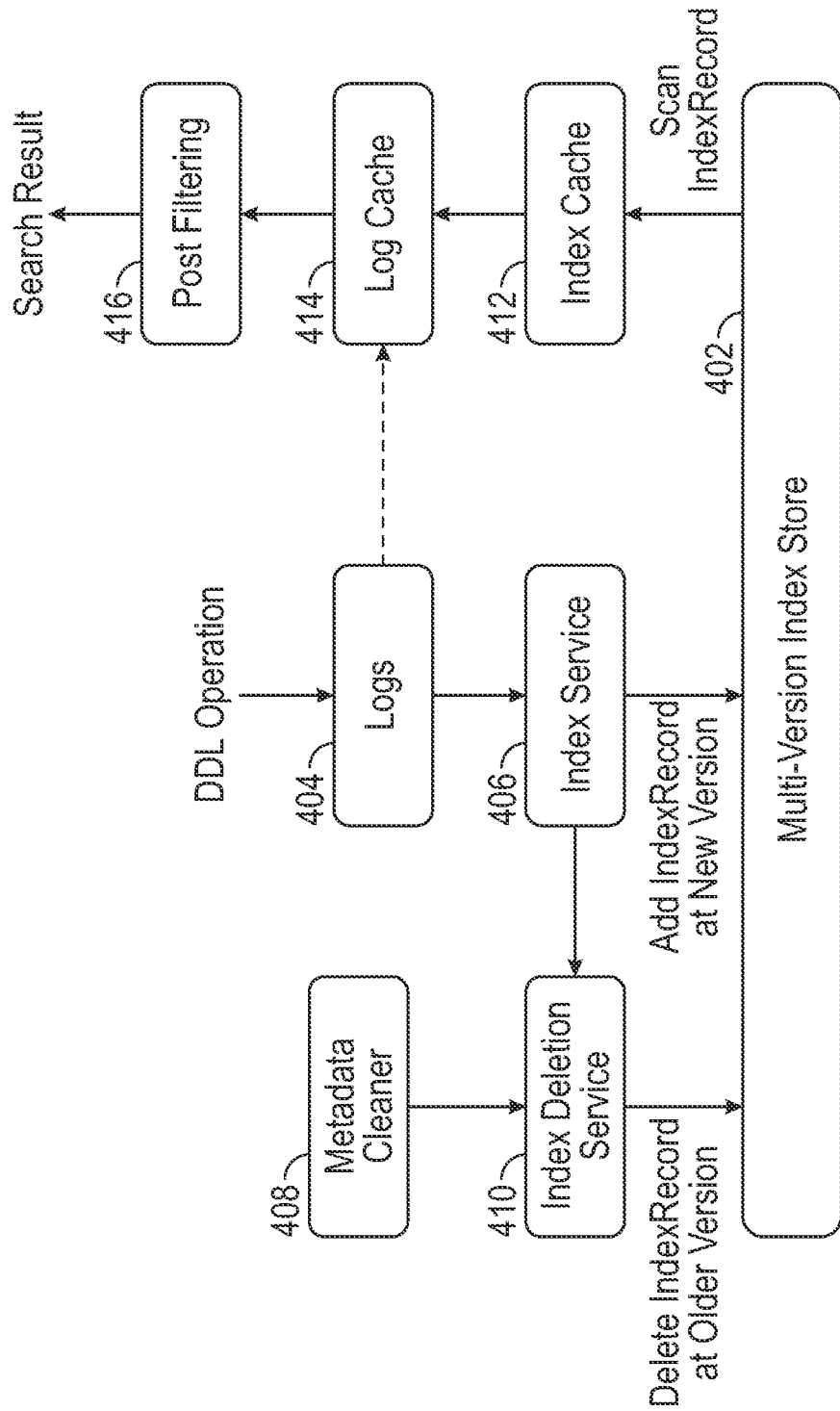
FIG. 4 shows an example of high-level architecture for a multi-version index store, according to some example embodiments.

FIG. 4 shows an example of high-level architecture supporting a multi-version index store, according to some example embodiments. The multi-version index store 402 (i.e., Scalable Index Store) may be generated and updated based on log data. For each DDL operation, a log may be created by a logs component 404. The DDL operations may include create/drop/undrop/rename and other similar type operations. An index record may not be created in the same transaction as the DDL operation because it may affect DDL performance, and the number of index records may be too many to process in the same transaction. Thus, an index service 406 may operate in the background using the logs of the DDL operations to modify the index store 402. The index service 406 may scan the logs to build and update the index. For example, the index service 406 may add an IndexRecord at a new version of the index.

A metadata cleaner 408 and index deletion service 410 may handle deletion/drop operations to ensure the respective deletion does not impact any current search requests while providing snapshot consistency for the current version of the index. For a drop/deletion operation, a deletion log may be created. The index service 406 may not delete the record based on the log; instead, the index service 406 may mark the appropriate data as to be deleted in a new version. Thus, a current search could still see the marked data that is to be deleted. Then, the index deletion service 410, after all searches or jobs associated with older versions of the index are completed, may delete the marked records. For example, the index deletion service 410 may delete an IndexRecord at an older version of the index.

FIG. 4 also shows, at a high level, how a search is completed using the multi-version index and log data. When a search is received, the current version of the index is cached in an index cache 412. For example, the index cache may scan the IndexRecord for the current version (and/or older versions). Also, logs that have not been serviced by the index service 406 are cached in a log cache 414 based on the search request time. The data in the index cache 412 and log cache 414 are merged. The merged data is then searched and the results are subject to post filtering 416, such as parent check, security check, etc. The post filtering 416 may ensure that the user has permission to access the records in the search results. The search results are then returned to the user. Details of the searching routine are described in further detail below.

Logs may be committed with the DDL operations. A detail log record keys may include:
1. AccountID
2. ChunkID/Versionstamp
3. Timestamp
4. Domain ID
5. EntityID The log record value may include: operation type such as create, drop, undrop, rename, make clone root visible (could also be treated as create); the entity name; the parent entity id; the new entity name (only for rename); the new parent entity id (only for rename across different parents); and the entity owner.

An IndexMetadataDPO (Data Persistence Object) may be added to the metadata store. The key may be AccountID. The values may include: 1) latest index version (this may monotonically increase, as described in further detail below); 2) UpdatedOn (which is the time of the last update of the index); and 3) Last Log ChunkID (of the last chunk (set of data) to be processed for updating the index).

Figure 5:
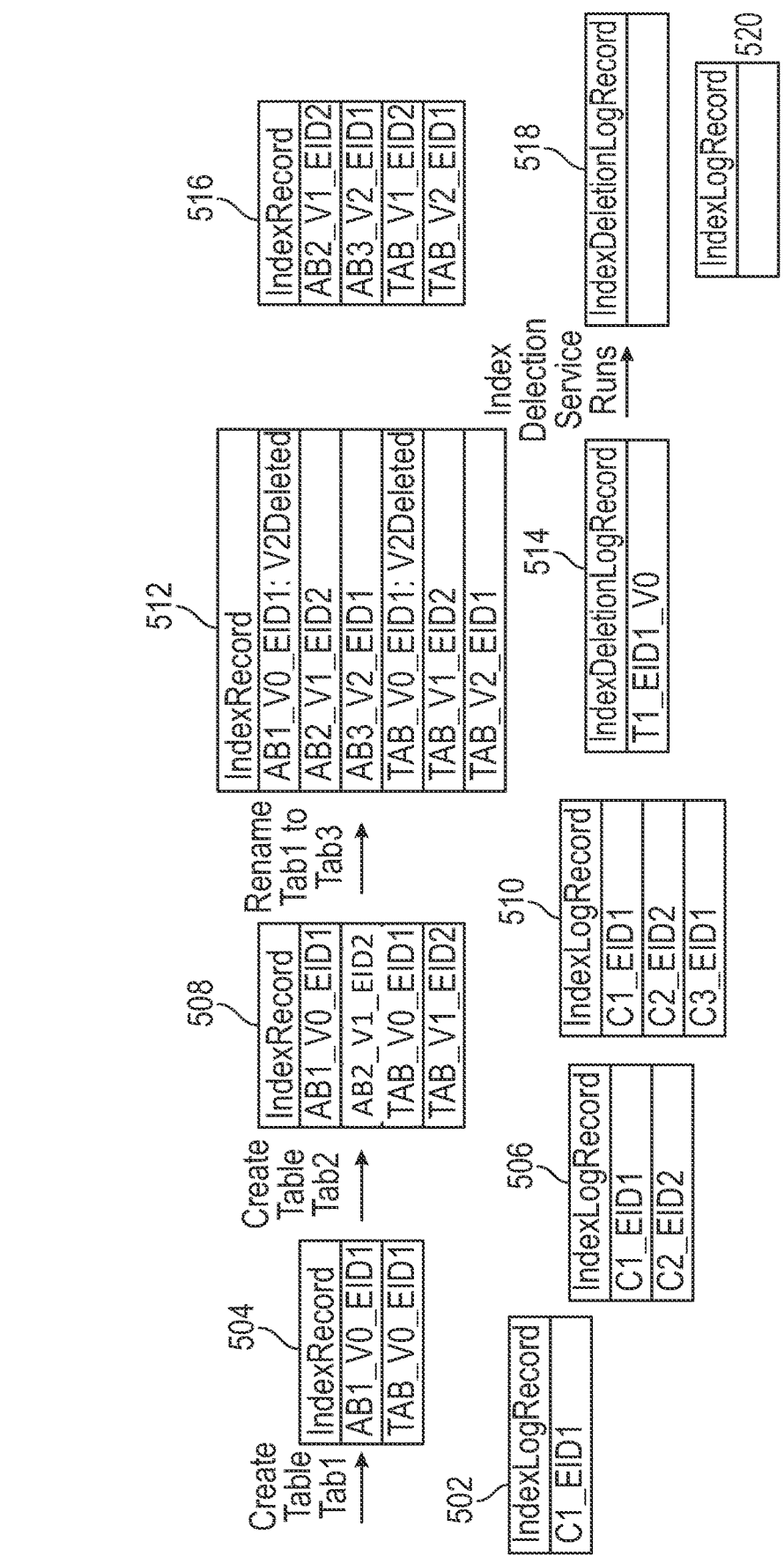
FIG. 5 shows an example of index evolving based on the different operations over time, according to some example embodiments.

A detailed IndexRecord may be created for each token. The index keys may include:
1. AccountID
2. Prefix (Boolean or flag to identify if the index key is for a prefix substring or not; such as 0 or 1 for prefix substring)
3. Token (e.g., "foob" string is a token)
4. IndexVersion
5. DomainID
6. ParentEntityID
7. EntityID FIG. 5 shows an example of index evolving based on the different operations over time, according to some example embodiments. For brevity and simplicity, only certain relevant excerpts of the changes to the records are shown and not all records are shown in FIG. 5. FIG. 5 shows the DDL operation of create table "tab1" and its corresponding IndexLogRecord 502 and IndexRecord 504. Here, IndexLogRecord 502 records the creation of table 1 with "C1_EID1." The IndexRecord 504 includes at least two n-gram record entries of "AB1_V0_EID1" and "TAB_V0_EID1," where n=3.

FIG. 5 shows then the DDL operation of create table "tab2" and its corresponding IndexLogRecord 506 and IndexRecord 508. Here, the IndexLogRecord records the creation of table 2 with "C2_EID2." The IndexRecord 508 is updated to include at least two new n-gram record entries of "AB2V1_EID2" and "TAB_V1_EID2."

FIG. 5 further shows the DDL operation of renaming "tab 1" to "tab3" and its corresponding IndexLogRecord 510 and IndexRecord 512. This last operation included a corresponding IndexDeletionLogRecord 514 and the marking of the associated data in the IndexRecord 512 as deleted (marking "AB1_V0_EID1" and "TAB_V0_EID1" as deleted). The index deletion service then deletes the marked index records based on the IndexDeletionLogRecord 514 as shown in IndexRecord 516, and then clears the IndexDeletionLogRecord 518 and corresponding IndexLogRecord 520.

Figure 6:
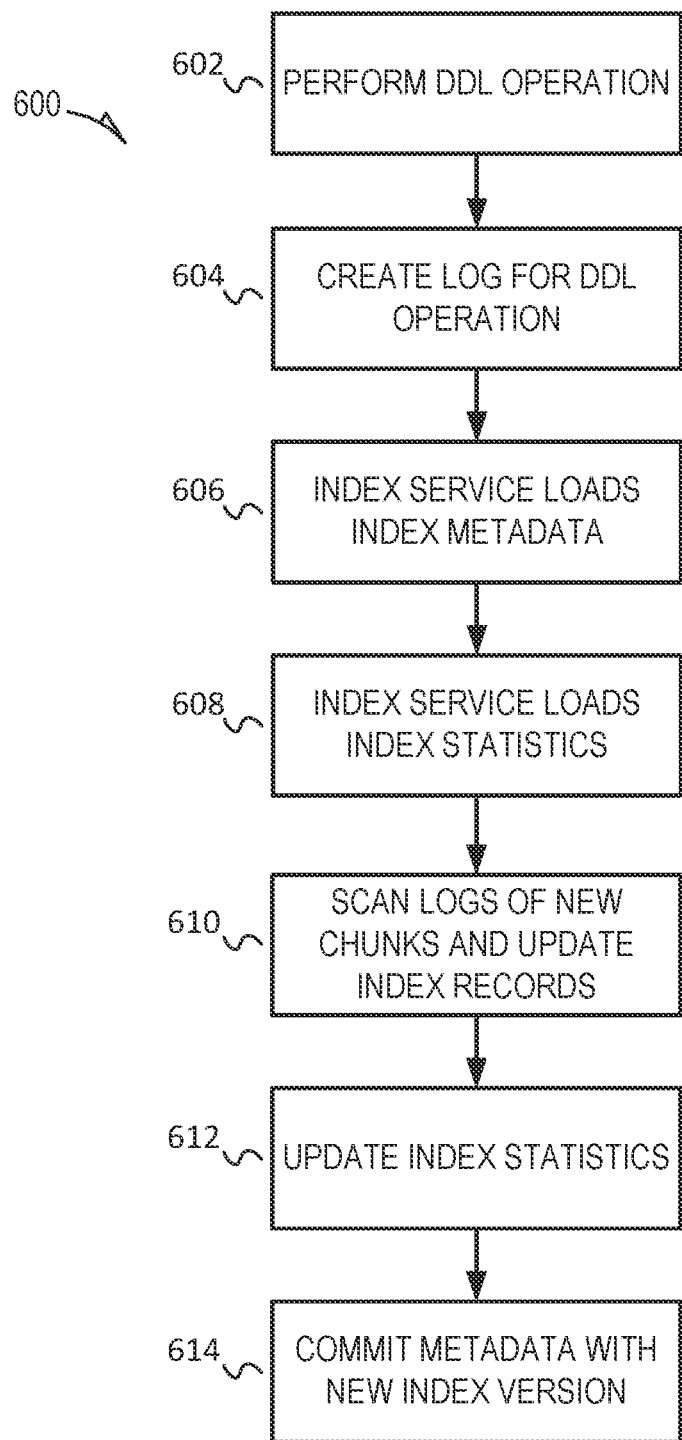
FIG. 6 a flow diagram of a method for updating an index, according to some example embodiments.

FIG. 6 is a flow diagram of a method 600 for updating an index, according to some example embodiments. At operation 602, a user performs a DDL operation such as creates/drops/renames/undrop an entity and that DDL operation is received. At operation 604, a log corresponding to the DDL operation may be created and added to the metadata store. The log may be associated with a current ChunkID, which corresponds to an ID for a set of data grouped together. At operation 606, the index service may load the IndexMetadataDPO to retrieve data such as the last log ChunkID and the last IndexVersion. At operation 608, the index service may load IndexTokenStatsDPOs (statistics).

At operation 610, the index service may scan the logs of the new-sealed chunks and for each log: an index record may be created or updated, the entity's index version slice may be created or updated with the new index version, and token statistics may be updated. This may be based on the type of DDL operation in the log. For example, for the entity create/undrop or make clone root visible, the system may create the index record for the entity. For the updrop, the system may not update the existing index record, but instead it may add a new index record with the new index version for the entity and the existing index record may be deleted by the index deletion service. For an entity drop operation, the system may update the existing index record with the deleted index version (the next index version) and add a new index deletion log record. If the entity has child entities, the index records of the child entities may still be in the index. For the entity rename, the system may update the existing index record(s) with the deleted index version, write the new index record(s) for the new names and add a new index deletion log record.

At operation 612, the index token stats DPOs may be updated in the metadata store. At operation 614, the index metadata DPO may be committed with the new index version, chunkID, etc.

Figure 7:
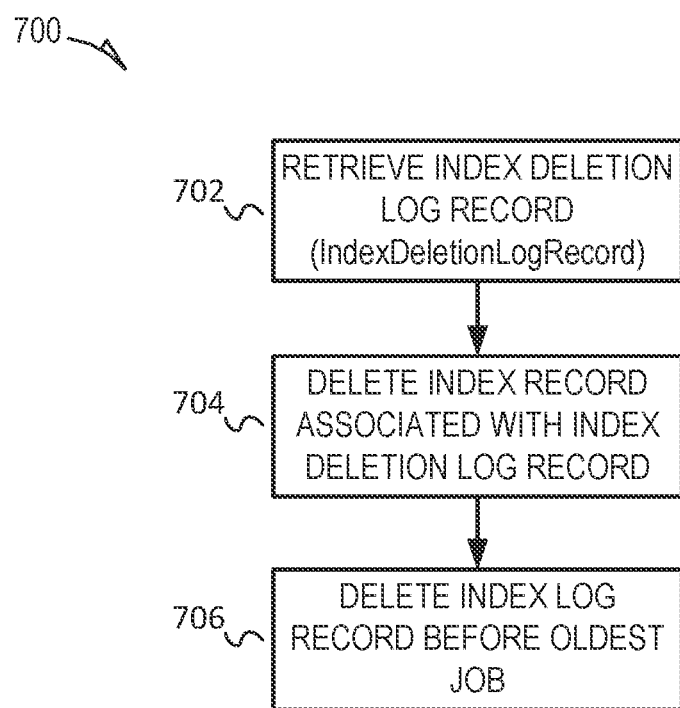
FIG. 7 shows a flow diagram of a method for deleting index records, according to some example embodiments.

FIG. 7 is a flow diagram of a method 700 for deleting index records, according to some example embodiments. Method 700 may be executed by the index deletion service described above in some embodiments. At operation 702, the index deletion log records before the oldest job (a window) may be retrieved (e.g., IndexDeletionLogRecord).

The index deletion log records may be created by the index service as described above. At operation 704, for each index deletion log record, all relevant index records to delete may be found and deleted, and the index deletion log record may be deleted after the index records are deleted. At operation 706, all index log records before the oldest job may be deleted.

Figure 8:
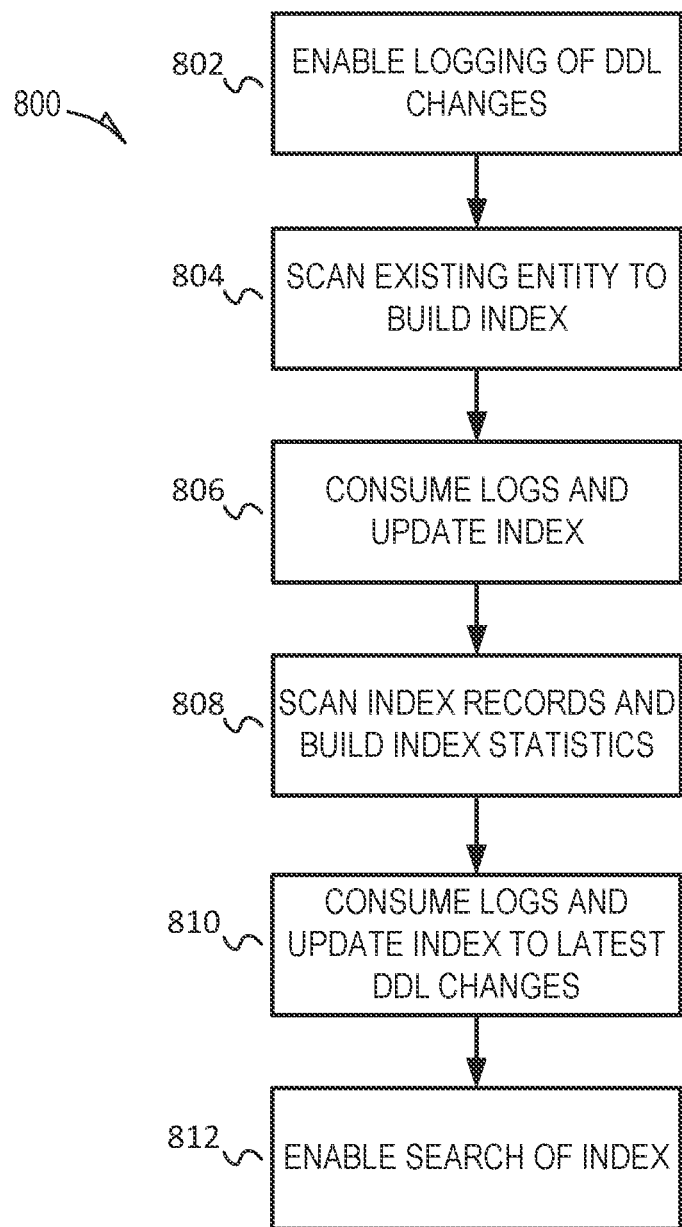
FIG. 8 shows a flow diagram of a method for initial bootstrapping to build the N-gram index for existing entities, according to some example embodiments.

FIG. 8 is a flow diagram of a method 800 for initial bootstrapping to build the N-Gram index for existing entities, according to some example embodiments. At operation 802, the system may enable logging for DDL changes and metadata cleaning. At 804, the system may scan existing entity DPOs (the active_by_name slice) to build the index. At operation 806, the system may consume the index logs and update the index as described above. At operation 808, the system may scan index records and build index statistics as described above. At operation 810, the system may check and consume index logs again to catch up to latest DDL changes until all logs are consumed. At 812, the system may enable search of the index.

Figure 9:
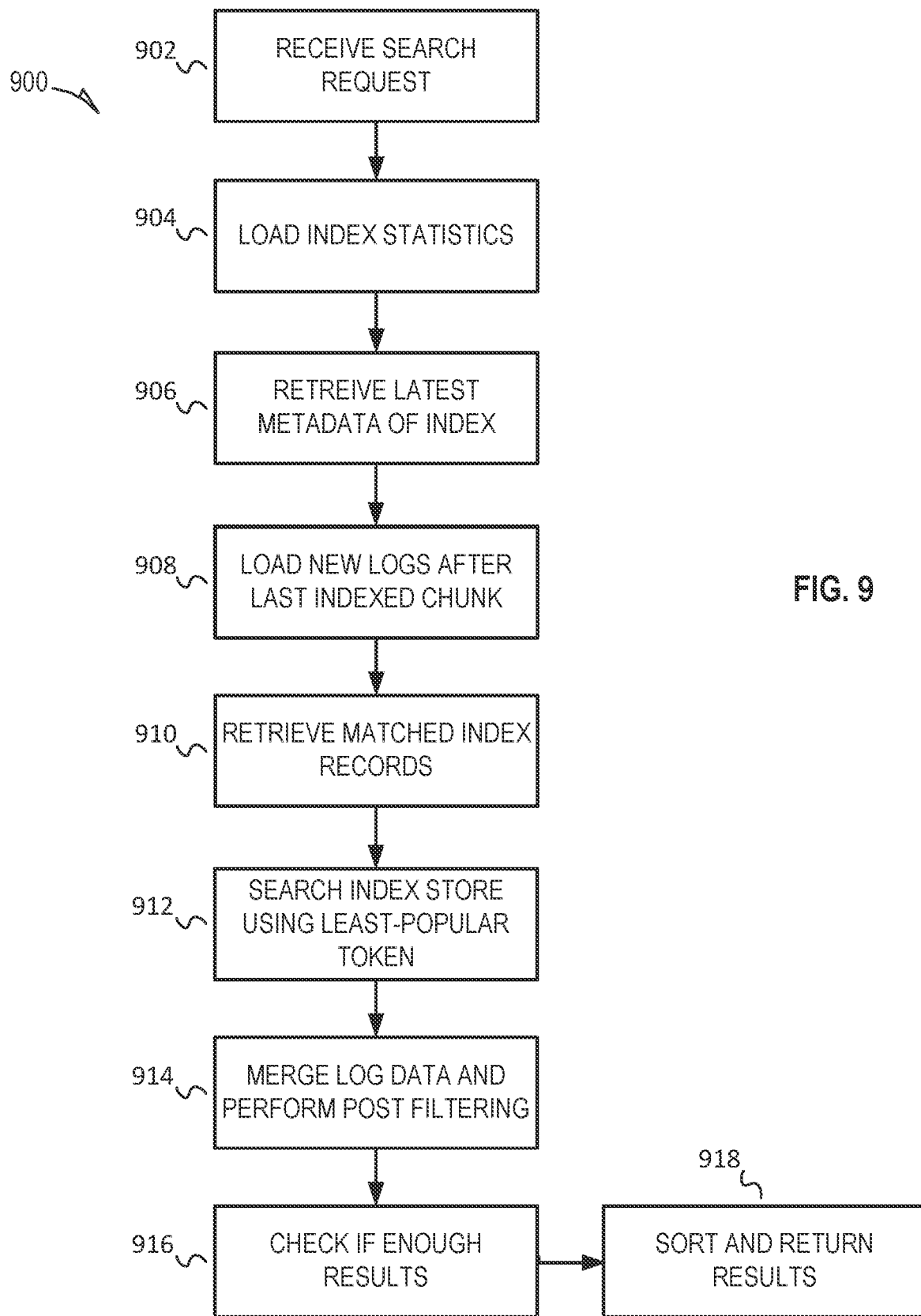
FIG. 9 is a flow diagram for searching using a N-gram index, according to some example embodiments.

FIG. 9 is a flow diagram 900 for searching using a N-Gram index, according to some example embodiments. At operation 902, a search request may be received. The search request may include a substring. At operation 904, the system may load the IndexTokenStatsDPOs (statistics, e.g., number of times a token appears). The GS may cache the token stats and periodically refresh them. If all search sub strings are popular tokens, the system may use a top-down search. If some token is not the popular token, the method may continue to the next step. At operation 906, the system may retrieve the latest index store metadata, which includes the last index version and the last handled log Chunk.

At operation 908, the system may load new logs after the last indexed Chunk. The logs may be cached in memory and may be shared by concurrent searches. The log cache may build some in memory data structure to speed up the merge, described below. For the entity creation/undrop/cloneMadeVisible log, the system may directly construct the IndexRecords. For the entity drop log, the system may add to the DeletedMap. For the entity rename log, the system may add the old name to the DeletedMap, and may directly construct the IndexRecords for the new name.

At operation 910, the system may retrieve the IndexRecords that matches the current search, check the permission to access the entity. For example, the system may check the permission to the parent schema/db, and check if parent is visible (clone, drop).

At operation 912, the system may use the least-popular token in the search substring to search the index store. For example, the system may scan the metadata store with "AID+Prefix+Token+KeyInterval (0, latestVersion)." Prefix matches are given preference over other string matches. That is, the system may search for true prefix (e.g., "1" in prefix), and then search false prefix (e.g., "0" in prefix). The results from the index may be cached in memory for future searches.

At operation 914, the system performs post filtering on results. Post filtering may include filtering out the IndexRecords with the deletedIndexVersion set. Post filtering may also include merging the index results with the logs, which may include filtering out the IndexRecords that in the DeletedMap built from logs. The system may also check the exact name match (case-sensitive/insensitive) and may check the permission to the entity. The system may also check the permission to the parent schema/db (reuse the EntityDPOCache), check if the parent is visible (clone, drop). The search can also utilize a local cache to avoid loading the same parent twice.

At operation 916, the system may check if there are enough results (e.g., above a set threshold). If there are not enough results, the system may continue searching the index store from the last returned record and perform the post filtering until enough results are obtained.

At operation 918, the results may be sorted by the system and returned to the user.

Figure 10:
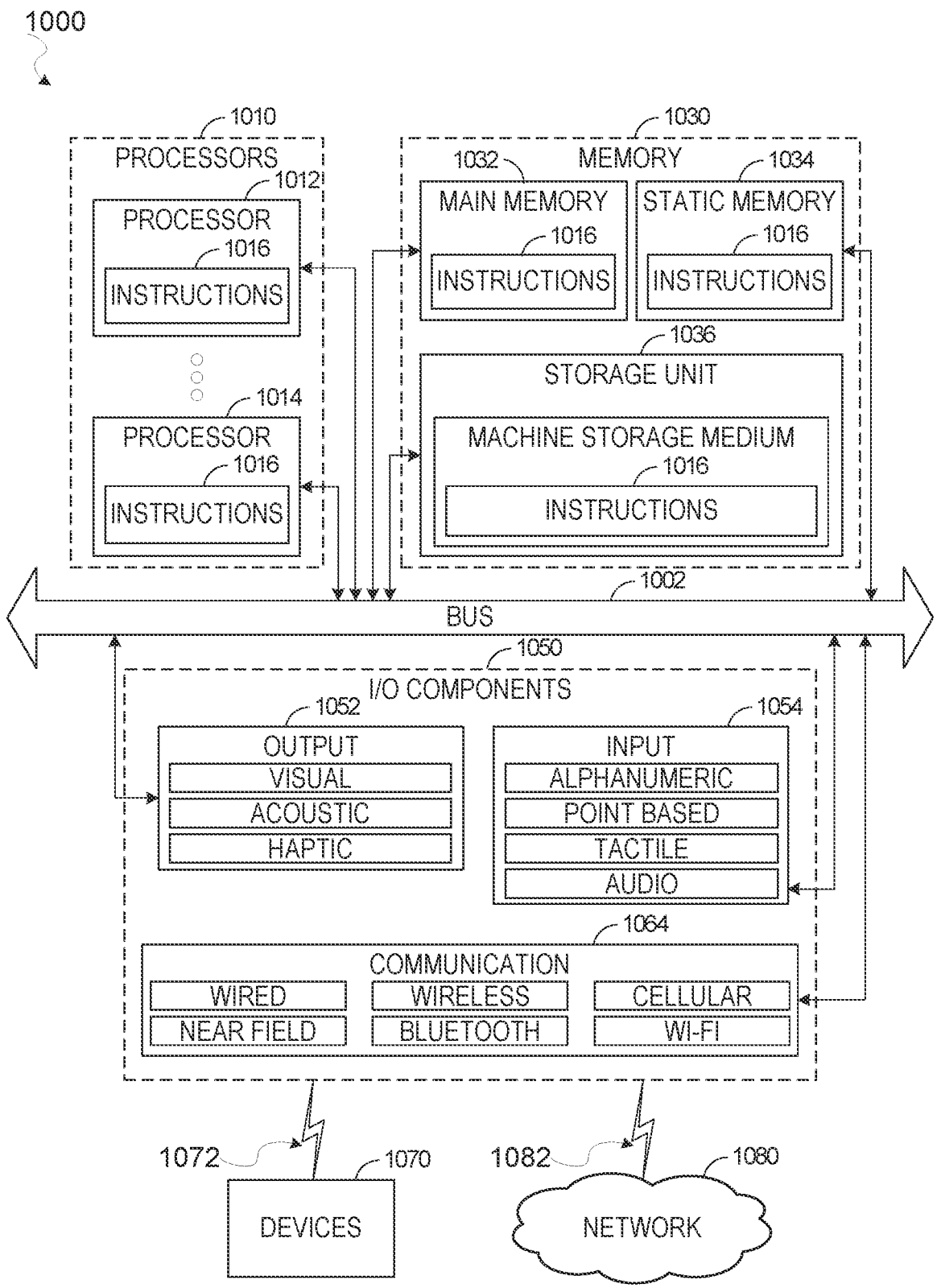
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of any one or more of the methods described herein. As another example, the instructions 1016 may cause the machine 1000 to implement portions of the data flows described herein. In this way, the instructions 1016 transform a general, non-programmed machine into a particular machine 1000 (e.g., the remote computing device 106, the access management system 110, the compute service manager 112, the execution platform 114, the access management system 118, the web proxy 120, remote computing device 106) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the remote computing device 106, the access management system 118, the compute service manager 112, the execution platform 114, the web proxy 120, and the devices 1070 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: in response to an operation being performed on a source table, creating a log associated with the operation; based on the log, creating or updating an index record for a N-Gram index associated with the source table to generate a new version of the N-Gram index; and based on the index record, updating metadata associated with the N-Gram index to facilitate searching of the N-Gram index.

Example 2. The method of example 1, further comprising: in response to a search request including a search string, loading index statistics of the N-Gram index; retrieving metadata associated with the N-Gram index; loading log data associated with new logs not yet reflected in the N-Gram index; retrieving index records matching the search string; merging the log data with the matched index records and performing post filtering; and based on the post filtering, returning results of the search request.

Example 3. The method of any of examples 1-2, wherein the post filtering includes a permission check to determine if a user submitting the search request has access rights to the data in the results.

Example 4. The method of any of examples 1-3, wherein the operation includes a delete operation, the method further comprising: generating an index deletion log record associated with the delete operation; marking an index record in the N-Gram index associated with the delete operation; and based on at least one search associated with an older version of the N-Gram index being completed, deleting the marked index record based on the index deletion log record.

Example 5. The method of any of examples 1-4, wherein the marked index record is not deleted in a same transaction as the delete operation.

Example 6. The method of any of examples 1-5, wherein N-Gram index includes partial N-grams for at least last N characters of a name.

Example 7. The method of any of examples 1-6, wherein index records for the N-Gram index include a prefix portion indicating whether the corresponding index record is for a prefix substring.

Example 8. The method of any of examples 1-7, wherein the log includes an account ID, a chunk ID, a timestamp, a domain ID, and an entity ID.

Example 9. The method of any of examples 1-8, wherein each index record of the N-Gram index includes an account ID, a prefix portion, an index version, a domain ID, and a parent entity ID.

Example 10. A system comprising: one or more processors of a machine; and a memory storing instructions that, when executed by the one or more processors, cause the machine to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method comprising:
    in response to an operation being performed on a source table, creating a log associated with the operation;
    based on the log, creating or updating an index record for a N-Gram index associated with the source table to generate a new version of the N-Gram index;
    based on the index record, updating metadata associated with the N-Gram index to facilitate searching of the N-Gram index;
    receiving, from a user, a search request including a search string, and
    in response to the search request including the search string, processing the search request by performing steps including:
        loading, in a log cache, log data associated with new logs not yet reflected in the N-Gram index,
        retrieving index records matching the search string and storing the index records in an index cache,
        merging the log data in the log cache with the index records in the index cache to generate merged data,
        performing a permission check on the merged data to determine that the user has access rights to the merged data, and
        generating results of the search request based on the merged data and the permission check,
    wherein the new logs are updated in the N-gram index in a separate process than processing the search request.

2. The method of claim 1, further comprising:
    in response to the search request , loading index statistics of the N-Gram index;
    retrieving metadata associated with the N-Gram index; and
    performing post filtering of the merged log data and matched index records.

3. The method of claim 1, wherein the operation includes a delete operation, the method further comprising:
    generating an index deletion log record associated with the delete operation;
    marking an index record in the N-Gram index associated with the delete operation; and
    based on at least one search associated with an older version of the N-Gram index being completed, deleting the marked index record based on the index deletion log record.

4. The method of claim 1, wherein the marked index record is not deleted in a same transaction as the delete operation.

5. The method of claim 1, wherein N-Gram index includes partial N-grams for at least last N characters of a name.

6. The method of claim 1, wherein index records for the N-Gram index include a prefix portion indicating whether the corresponding index record is for a prefix substring.

7. The method of claim 1, wherein the log includes an account ID, a chunk ID, a timestamp, a domain ID, and an entity ID.

8. The method of claim 1, wherein each index record of the N-Gram index includes an account ID, a prefix portion, an index version, a domain ID, and a parent entity ID.

9. A system comprising:
    at least one hardware processor; and
    at least one memory storing instructions that, when executed by the at least one hardware processor, cause the at least one hardware processor to perform operations comprising:
    in response to an operation being performed on a source table, creating a log associated with the operation;
    based on the log, creating or updating an index record for a N-Gram index associated with the source table to generate a new version of the N-Gram index;
    based on the index record, updating metadata associated with the N-Gram index to facilitate searching of the N-Gram index;
    receiving, from a user, a search request including a search string, and
    in response to the search request including the search string, processing the search request by performing steps including:
        loading, in a log cache, log data associated with new logs not yet reflected in the N-Gram index,
        retrieving index records matching the search string and storing the index records in an index cache,
        merging the log data in the log cache with the index records in the index cache to generate merged data,
        performing a permission check on the merged data to determine that the user has access rights to the merged data, and
        generating results of the search request based on the merged data and the permission check,
    wherein the new logs are updated in the N-gram index in a separate process than processing the search request.

10. The system of claim 9, the operations further comprising:
    in response to the search request , loading index statistics of the N-Gram index;
    retrieving metadata associated with the N-Gram index; and
    performing post filtering of the merged log data and matched index records.

11. The system of claim 9, wherein the operation includes a delete operation, the operations further comprising:
    generating an index deletion log record associated with the delete operation;
    marking an index record in the N-Gram index associated with the delete operation; and
    based on at least one search associated with an older version of the N-Gram index being completed, deleting the marked index record based on the index deletion log record.

12. The system of claim 9, wherein the marked index record is not deleted in a same transaction as the delete operation.

13. The system of claim 9, wherein N-Gram index includes partial N-grams for at least last N characters of a name.

14. The system of claim 9, wherein index records for the N-Gram index include a prefix portion indicating whether the corresponding index record is for a prefix substring.

15. The system of claim 9, wherein the log includes an account ID, a chunk ID, a timestamp, a domain ID, and an entity ID.

16. The system of claim 9, wherein each index record of the N-Gram index includes an account ID, a prefix portion, an index version, a domain ID, and a parent entity ID.

17. A machine-storage medium embodying instructions that, when executed by a machine, cause the machine to perform operations comprising:
   in response to an operation being performed on a source table, creating a log associated with the operation;
   based on the log, creating or updating an index record for a N-Gram index associated with the source table to generate a new version of the N-Gram index;
   based on the index record, updating metadata associated with the N-Gram index to facilitate searching of the N-Gram index;
   receiving, from a user, a search request including a search string, and
   in response to the search request including the search string, processing the search request by performing steps including:
      loading, in a log cache, log data associated with new logs not yet reflected in the N-Gram index,
      retrieving index records matching the search string and storing the index records in an index cache,
      merging the log data in the log cache with the index records in the index cache to generate merged data,
      performing a permission check on the merged data to determine that the user has access rights to the merged data, and
      generating results of the search request based on the merged data and the permission check,
   wherein the new logs are updated in the N-gram index in a separate process than processing the search request.

18. The machine-storage medium of claim 17, further comprising:
   in response to the search request, loading index statistics of the N-Gram index;
   retrieving metadata associated with the N-Gram index; and
   performing post filtering of the merged log data and matched index records.

19. The machine-storage medium of claim 17, wherein the operation includes a delete operation, further comprising:
   generating an index deletion log record associated with the delete operation;
   marking an index record in the N-Gram index associated with the delete operation; and
   based on at least one search associated with an older version of the N-Gram index being completed, deleting the marked index record based on the index deletion log record.

20. The machine-storage medium of claim 17, wherein the marked index record is not deleted in a same transaction as the delete operation.

21. The machine-storage medium of claim 17, wherein N-Gram index includes partial N-grams for at least last N characters of a name.

22. The machine-storage medium of claim 17, wherein index records for the N-Gram index include a prefix portion indicating whether the corresponding index record is for a prefix substring.

23. The machine-storage medium of claim 17, wherein the log includes an account ID, a chunk ID, a timestamp, a domain ID, and an entity ID.

24. The machine-storage medium of claim 17, wherein each index record of the N-Gram index includes an account ID, a prefix portion, an index version, a domain ID, and a parent entity ID.

* * * * *